(12) United States Patent
Sant'Anna et al.

(10) Patent No.: US 12,377,678 B2
(45) Date of Patent: Aug. 5, 2025

(54) VEHICLE WHEEL DISC, VEHICLE WHEEL INCLUDING SUCH A WHEEL DISC AND METHOD FOR PRODUCING SUCH A WHEEL DISC AND VEHICLE WHEEL

(71) Applicant: Maxion Wheels Holding GmbH, Königswinter (DE)

(72) Inventors: Adriano Phoenix Sant'Anna, Pocos de Caldas (BR); Marcio Aparecido de Oliveira, Limeira (BR); Renato de Jesus Madeira, Vinhedo (BR); Alexandre André Costa Motta, Sao José do Alegre (BR); Marcelo Yumoto Graziani, Limeira (BR); Ralf Duning, Solingen (DE); Iosef Fanizza, Königswinter (DE)

(73) Assignee: Maxion Wheels Holding GmbH, Königswinter (DE)

( * ) Notice: Subject to any disclaimer, the term of this patent is extended or adjusted under 35 U.S.C. 154(b) by 757 days.

(21) Appl. No.: 17/686,488

(22) Filed: Mar. 4, 2022

(65) Prior Publication Data

US 2023/0278361 A1 Sep. 7, 2023

(51) Int. Cl.
*B60B 3/00* (2006.01)
*B60B 3/10* (2006.01)

(52) U.S. Cl.
CPC ............... *B60B 3/007* (2013.01); *B60B 3/10* (2013.01); *B60B 2310/213* (2013.01);
(Continued)

(58) Field of Classification Search
CPC .............. B60B 3/007; B60B 3/04; B60B 3/10
See application file for complete search history.

(56) References Cited

U.S. PATENT DOCUMENTS

| 1,650,780 A | | 11/1927 | Erastus | |
|---|---|---|---|---|
| 2,334,673 A | * | 11/1943 | Hawthorne | ............... B60B 3/04 301/105.1 |

(Continued)

FOREIGN PATENT DOCUMENTS

| CN | 104837576 A | * | 8/2015 | ............ B21D 22/02 |
|---|---|---|---|---|
| DE | 10156086 B4 | | 9/2006 | |

(Continued)

OTHER PUBLICATIONS

PCT International Search Report and Written Opinion, Application No. PCT/IB2023/051964, dated Apr. 28, 2023.

(Continued)

*Primary Examiner* — Kip T Kotter
(74) *Attorney, Agent, or Firm* — MacMillan, Sobanski & Todd, LLC

(57) ABSTRACT

A wheel disc includes a hub located centrally within the wheel disc and defining a wheel axis. The wheel disc further includes an outer circumferential edge and a transition portion radially extending between the hub and the outer circumferential edge. The transition portion has a front surface and a rear surface such that the front surface has a relatively smooth profile and the rear surface has a plurality of concentric ring-shaped curvatures formed therein, thereby providing the transition portion with a variable thickness between the front and rear surfaces.

29 Claims, 9 Drawing Sheets

(52) U.S. Cl.
CPC ... *B60B 2310/224* (2013.01); *B60B 2310/226* (2013.01); *B60B 2360/102* (2013.01); *B60B 2360/104* (2013.01); *B60B 2360/106* (2013.01); *B60B 2360/108* (2013.01); *B60B 2360/3416* (2013.01); *B60B 2900/111* (2013.01)

(56) References Cited

U.S. PATENT DOCUMENTS

| | | | |
|---|---|---|---|
| 3,627,382 | A | 12/1971 | Lejeune |
| 3,823,591 | A | 7/1974 | Schroder et al. |
| 4,134,284 | A | 1/1979 | Nitschke |
| 4,610,482 | A * | 9/1986 | Overbeck .............. B60B 3/10 29/894.323 |
| 5,295,304 | A | 3/1994 | Ashley |
| 5,388,330 | A * | 2/1995 | Daudi .................. B21D 53/30 29/894.323 |
| 5,435,632 | A | 7/1995 | Gajor et al. |
| 5,533,261 | A | 7/1996 | Kemmerer |
| 5,577,810 | A | 11/1996 | Abe et al. |
| 5,651,590 | A | 7/1997 | Word |
| 5,694,687 | A | 12/1997 | Coleman |
| 6,473,967 | B1 | 11/2002 | Coleman et al. |
| 6,546,629 | B2 | 4/2003 | Politi |
| 2012/0291283 | A1 | 11/2012 | Ikeda et al. |
| 2017/0291447 | A1 | 10/2017 | Vorbeck et al. |
| 2018/0319209 | A1 | 11/2018 | Chung |
| 2020/0108435 | A1 | 4/2020 | Gotou et al. |
| 2020/0391541 | A1 * | 12/2020 | Thiyagarajan .......... B60B 3/004 |

FOREIGN PATENT DOCUMENTS

| | | |
|---|---|---|
| DE | 102018220305 A1 | 5/2020 |
| EP | 0985552 A2 | 3/2000 |
| GB | 202888 A | 8/1923 |
| WO | 9425198 | 11/1994 |
| WO | 2019171159 A1 | 9/2019 |
| WO | 2015159231 A1 | 8/2022 |

OTHER PUBLICATIONS

PCT International Search Report and Written Opinion, Application No. PCT/IB2023/051962, dated May 2, 2023.
PCT International Search Report and Written Opinion, Application No. PCT/IB2023/051963, dated Apr. 28, 2023.
PCT International Search Report and Written Opinion, Application No. PCT/IB2023/051965, dated Apr. 28, 2023.
PCT International Search Report and Written Opinion, Application No. PCT/IB2023/051966, dated Apr. 28, 2023.
International Search Report and Written Opinion, Application No. PCT/IB2023/051953, dated May 11, 2023.

* cited by examiner

VEHICLE WHEEL DISC, VEHICLE WHEEL INCLUDING SUCH A WHEEL DISC AND METHOD FOR PRODUCING SUCH A WHEEL DISC AND VEHICLE WHEEL

BACKGROUND OF THE INVENTION

The present invention relates in general to a vehicle wheel disc and vehicle wheel and in particular to an improved wheel disc, vehicle wheel including such a wheel disc and method for producing such a wheel disc and vehicle wheel.

Wheels for automotive vehicles may be formed by joining multiple components together. For example, a wheel may consist of two formed steel parts joined together, such as by welding. One known conventional wheel includes a generally planar or circular wheel disc welded to an outer circumferential edge portion of an annular outer rim. The outer rim has a suitable annular shape for receiving and supporting a tire. The wheel disc includes a central hub portion that functions as a wheel mounting portion of the wheel for connecting with an axle via a plurality of lug bolts and lug nuts.

It is known to produce a wheel disc by a flow forming or flow turning process. In a flow forming process, a flow forming machine is used to form a circular steel blank into the desired shape of the wheel disc. For example, the steel blank may be clamped at a central region or hub area. The material of the disc extended radially outwardly from the hub is pressed and elongated by means of flow forming under rotation of the blank against a spinning chuck and/or other tools in order to obtain the desired contour. Conventional wheel discs which are made by flow forming or flow turning generally have uniform surfaces on their inner and outer sides of the wheel disc. This provides a wheel disc that can withstand the loads occurred thereon during operation of the vehicle upon which the wheel is mounted. Although such flow forming processes provide wheel discs having sufficient rigidity, it would be desirable to produce a wheel disc which optimizes the material usage of the wheel disc which may reduce the overall mass of the wheel disc.

SUMMARY OF THE INVENTION

The present invention relates to an improved wheel disc, vehicle wheel including such a wheel disc and method for producing such a wheel disc and vehicle wheel as illustrated and/or described herein.

According to one embodiment, the wheel disc is configured for use in a full face fabricated vehicle wheel and may comprise, individually and/or in combination, one or more of the following features, elements, or advantages: a wheel disc includes a hub located centrally within the wheel disc and defining a wheel axis. The wheel disc further includes an outer circumferential edge and a transition portion radially extending between the hub and the outer circumferential edge. The transition portion has a front surface and a rear surface such that the front surface has a relatively smooth profile and the rear surface has a plurality of concentric ring-shaped curvatures formed therein, thereby providing the transition portion with a variable thickness between the front and rear surfaces.

According to this embodiment, the concentric ring-shaped curvatures include undulations formed in the rear surface of the transition portion.

According to this embodiment, the undulations are formed as alternating convex and concave ring-shaped curves concentric about the wheel axis.

According to this embodiment, a plurality of vent holes are formed in the transition portion.

According to this embodiment, the transition portion is subdivided into a plurality of concentric segments.

According to this embodiment, the transition portion is divided into first, second, third, fourth, and fifth sequential segments extending radially outwardly from the wheel axis.

According to this embodiment, the first segment includes anywhere from zero to three ring-shaped curvatures, the second segment includes anywhere from zero to two ring-shaped curvatures, the third segment includes anywhere from one to twenty ring-shaped curvatures, the fourth segment includes anywhere from zero to two ring-shaped curvature, the fifth segment includes anywhere from zero to three ring-shaped curvatures.

According to this embodiment, the first segment has a maximum thinning of 40% of a thickness of the hub, the second segment has a maximum thinning of 40% of the thickness of the hub, the third segment has a maximum thinning of 60% of the thickness of the hub, the fourth segment has a maximum thinning of 40% of the thickness of the hub, and/or the fifth segment has a maximum thinning of 60% of the thickness of the hub.

According to this embodiment, the concentric segments include undulations formed as alternating convex and concave ring-shaped curves concentric about the wheel axis in the rear surfaces of the first, second, third, and fourth segments.

According to this embodiment, the first segment is adjacent an outer edge of the hub.

According to this embodiment, the front surface of the first segment has a frustoconical shape sloped at a first angle relative to the wheel axis.

According to this embodiment, the front surface of the third segment has a frustoconical shape sloped at a second angle relative to the wheel axis.

According to this embodiment, the third segment includes vent holes formed therein, and wherein the third segment has a radial length of about between 50 percent to about 70 percent of the radial length of the transition portion.

According to this embodiment, the first angle is different from the second angle.

According to this embodiment, the second segment joins the first and third segments together with a curvature that smoothly blends in with the first and third segments.

According to this embodiment, the rear surface of the fifth segment is generally planar and perpendicular to the wheel axis.

According to this embodiment, the fourth segment joins the third and fifth segments together with a curvature that smoothly blends in with the third and fifth segments.

According to this embodiment, the rear surface of the fifth segment does not include concentric ring-shaped curvatures formed therein.

According to this embodiment, the rear surface of the fifth segment has a relatively smooth profile.

According to this embodiment, the wheel disc is produced by a flow forming process by flow forming a metallic blank, during elongation of a preformed marginal region adjoining the clamped hub.

According to this embodiment, the metallic blank is a steel blank.

According to this embodiment, the wheel disc is a steel wheel disc.

According to this embodiment, the wheel disc is an aluminum, magnesium, titanium or alloys thereof, carbon fiber and/or a composite material wheel disc.

According to another embodiment, a steel wheel disc is configured for use in a full face fabricated vehicle wheel and may comprise, individually and/or in combination, one or more of the following features, elements, or advantages: a hub located centrally within the wheel disc and defining a wheel axis; an outer circumferential edge; and a transition portion radially extending between the hub and the outer circumferential edge and having a plurality of vent holes formed therein, wherein the transition portion has a front surface and a rear surface such that the front surface has a relatively smooth profile and the rear surface has at least one concentric ring-shaped curvature formed therein, thereby providing the transition portion with a variable thickness between the front and rear surfaces.

According to this embodiment, the transition portion includes anywhere from one to twenty ring-shaped curvatures and the transition portion has a maximum thinning of 60% of a thickness of the hub.

According to another embodiment, a method of manufacturing a vehicle wheel disc configured for use in a full face fabricated vehicle wheel may comprise, individually and/or in combination, one or more of the following steps, features, elements, or advantages: (a) providing a metallic preform; (b) positioning the preform on a mandrel of a flow forming machine; and (c) flow forming the preform against the mandrel by a rolling tool to form a wheel disc having: a hub located centrally within the wheel disc and defining a wheel axis; an outer circumferential edge; and a transition portion radially extending between the hub and the outer circumferential edge, wherein the transition portion has a front surface and a rear surface such that the front surface has a relatively smooth profile and the rear surface has a plurality of concentric ring-shaped curvatures formed therein, thereby providing the transition portion with a variable thickness between the front and rear surfaces produced during flow-forming by displacement of the rolling tool.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
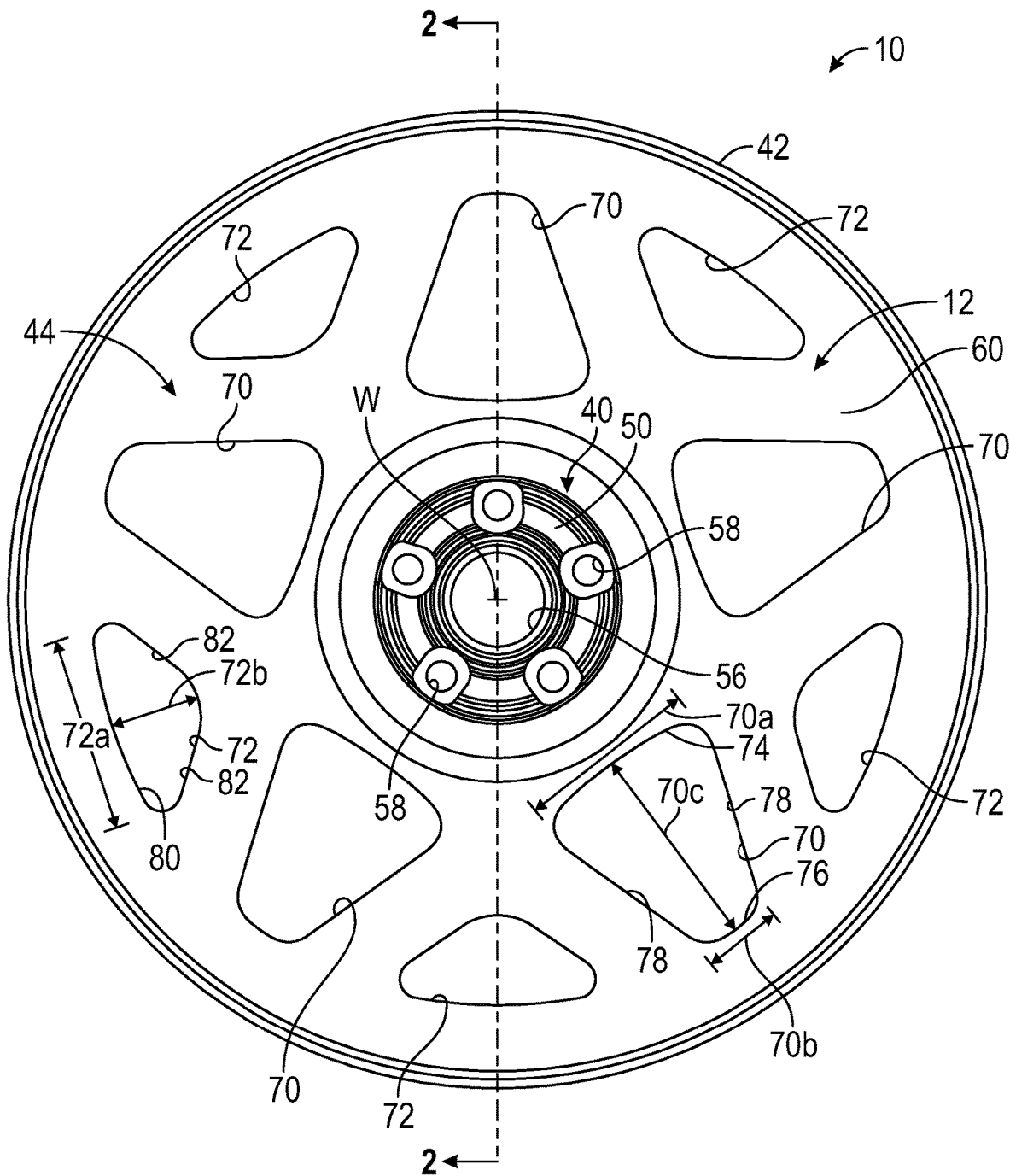
FIG. 1 is a front elevational view of an embodiment of a vehicle wheel in accordance with the present invention.

Referring now to the drawings, there is illustrated in FIGS. 1 through 4 a "full face" vehicle wheel, indicated generally at 10. The vehicle wheel 10 generally incudes an inner "full face" wheel disc, indicated generally at 12, and an annular outer "partial" wheel rim 14. Although the invention is illustrated and described in conjunction with the particular vehicle wheel construction disclosed herein, it will be appreciated that the invention can be used in conjunction with other types of "full face" vehicle wheel constructions.

In a preferred embodiment (and as illustrated herein), the wheel disc 12 and the wheel rim 14 are produced separately and then joined together by any suitable means, such as by welding, to produce a fabricated full face vehicle wheel 10. In a preferred embodiment, the wheel disc 12 and the wheel rim 14 are made from steel and are then secured together, such as by a weld 16 (shown in FIG. 2), to form the wheel 10. Of course, the wheel disc 12 and/or the wheel rim 14 may be made of any suitable materials such as for example, aluminum, magnesium, titanium or alloys thereof, carbon fiber and/or composite materials and/or may be secured together by any suitable means, if so desired.

The combination of the wheel disc 12 and the wheel rim 14 defines a wheel axis W for the wheel 10. The wheel rim 14 can have any suitable annular shape for receiving and supporting a tire (not shown). The wheel rim 14 preferably has a continuous annular shape relative to the wheel axis W for accommodating a vehicle tire (not shown) mounted thereon. It should be appreciated that the wheel rim 14 can have any desired diameter and/or shape. In a preferred embodiment, the wheel rim 14 has an outer diameter or a wheel diameter within the range of about 405 millimeters (about 16 inches), to about 560 millimeters (about 22 inches).

In a preferred embodiment (and as illustrated herein), the steel wheel rim 14 is formed by a rolling and forming process to obtain the desired annular shape, as shown in FIGS. 1 through 4. The wheel rim 14 includes a front circumferential edge 20, and a rear facing circumferential edge 22. The wheel rim 14 further includes a generally tubular or cylindrical central wall 24 extending between the edges 20 and 22. The central wall 24 may have any suitable shape for receiving the tire as well as providing rigidity to the annular shaped outer rim 14. Thus, the central wall 24 is preferably not perfectly tubular or cylindrical but includes curvatures or bends therein.

Figure 2:
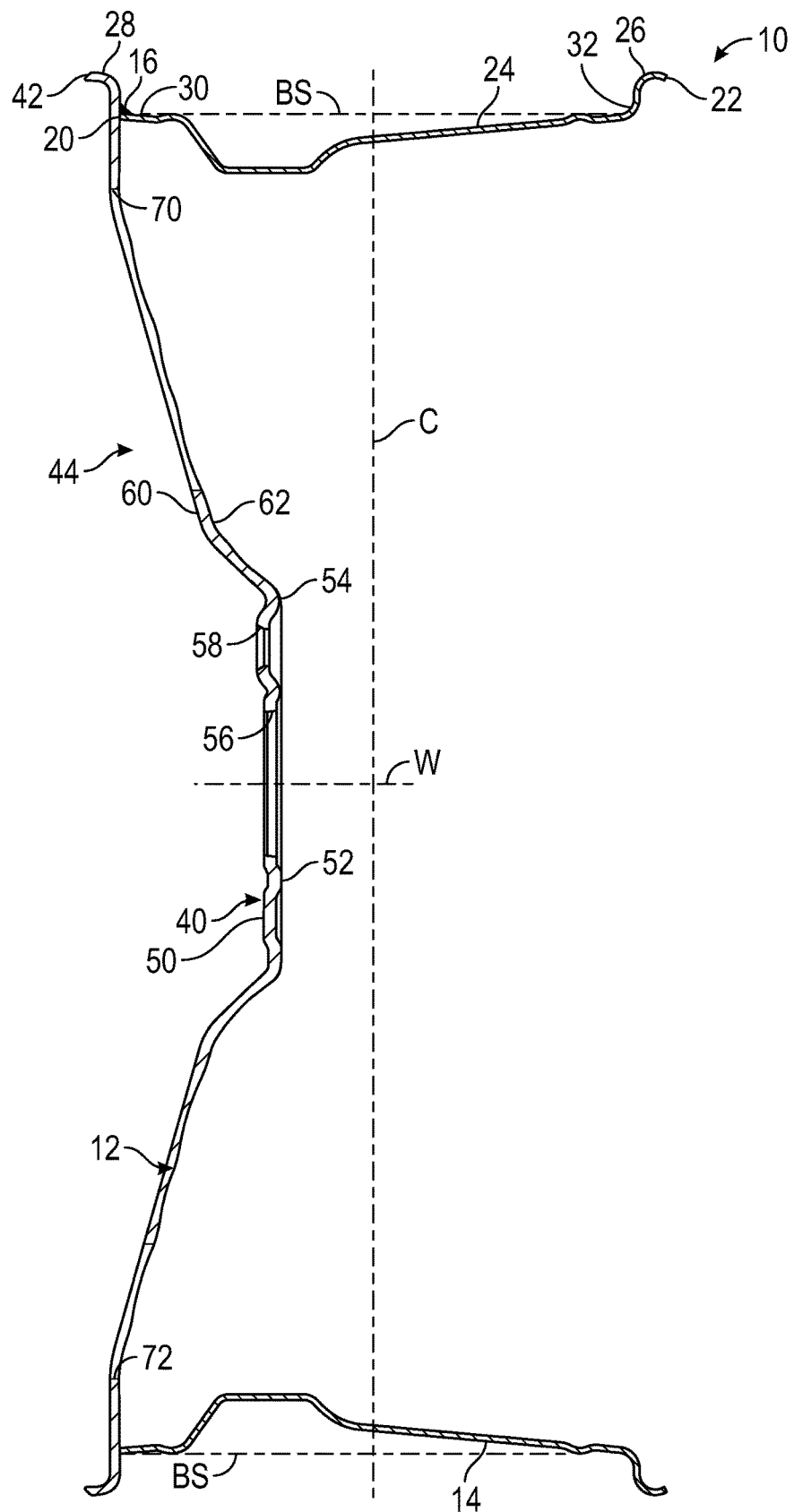
FIG. 2 is a cross-sectional view of the wheel taken along lines 2-2 of FIG. 1.
Figure 3:
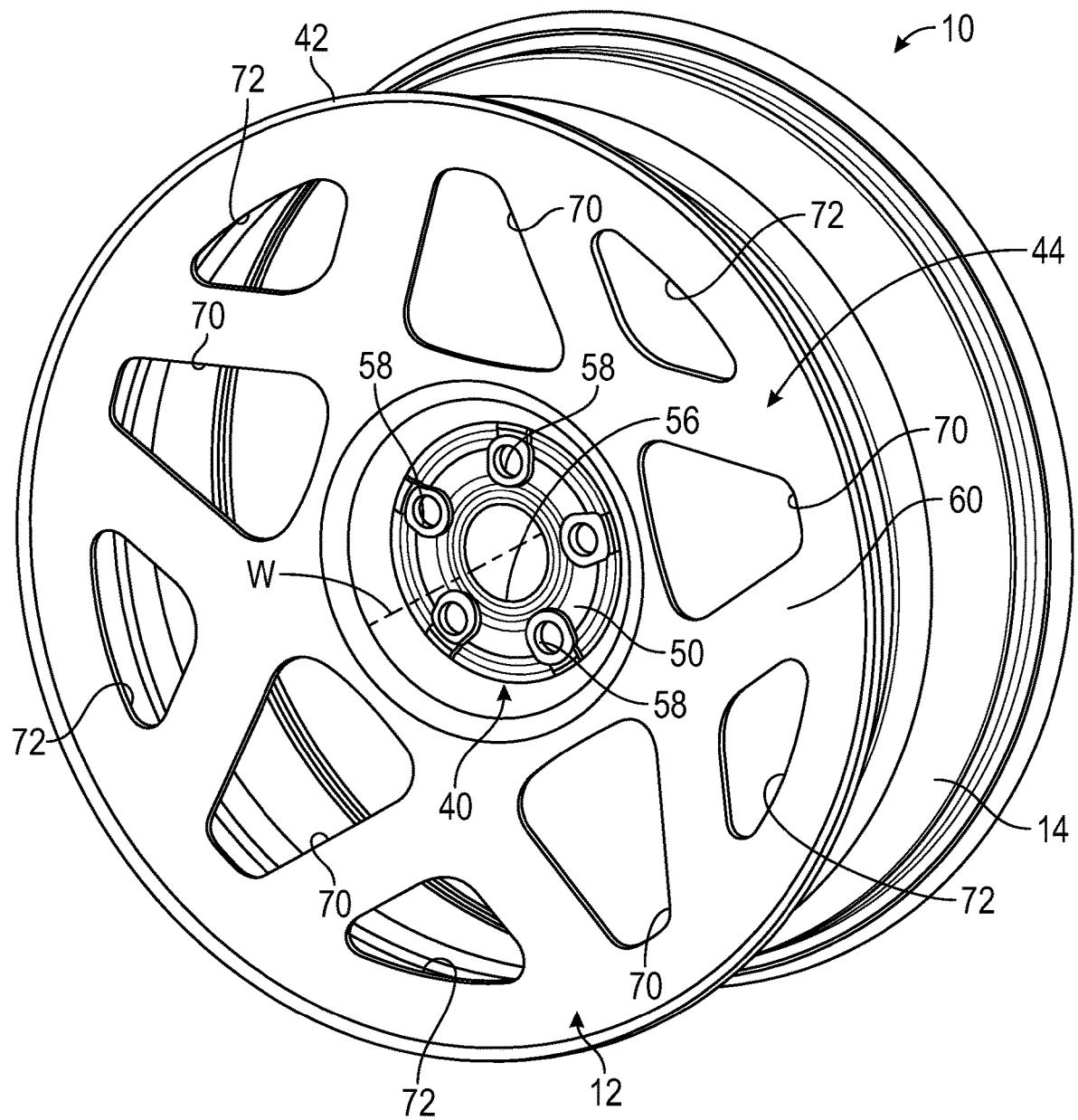
FIG. 3 is a front perspective view of the wheel of FIG. 1.

As best shown in FIG. 2, the rear edge 22 of the wheel rim 14 defines a curled lip portion 26 for contacting and sealing against a wall of the tire when mounted on the finished wheel 10. The front edge 20 is formed to provide a joining welding edge with the rear of the wheel disc 12. It is noted that in the illustrated embodiment as best shown in FIG. 2, the outer circumferential edge of the wheel disc 12 defines a curled lip portion 28 for contacting and sealing against a wall of the tire when mounted on the wheel 10. Of course, the wheel disc 12 and the wheel rim 14 could be alternatively formed such that the curled lip portion 28 is formed on the wheel rim 14 instead. In this situation, the outer circumferential edge of the wheel disc would have a smaller diameter and would be welded to an interior wall of the central wall 24.

When the wheel 10 is formed by joining the wheel disc 12 to the outer rim 14, the wheel 10 defines a centerline C or center-plane that is approximately located equally spaced axially from the curled lip portions 26 and 28 of the wheel 10, as shown in FIG. 2. The wheel 10 includes circular bead seats 30 and 32 where the tire contacts and seals against the wheel 10. The bead seats 30 and 32 may be located generally adjacent to the curled lip portions 28 and 26, respectfully. Broken lines, indicated generally by BS, schematically represent the bead seat or inner diameter portion of a tire that is mounted on the wheel 10. The conventionally known "rim width" may be determined as the axial distance between the bead seats 30 and 32. The wheel diameter is generally the radial diameter of the bead seats 30 and 32.

The wheel disc 12 is generally comprised of or defined by three portions: a central hub, indicated generally at 40, an outer circumferential edge 42, and an annular transition portion, indicated generally at 44. The hub 40 is preferably circular and is generally defined as the central portion of the wheel disc 12 and functions as a wheel mounting portion or center mounting portion of the wheel 10. Note that the outer circumferential edge 42 includes the curled lip portion 28. The transition portion 44 is generally annulus or ring-shaped and radially extends between the hub 40 and the outer circumferential edge 42. The transition portion 44 generally encircles the hub 40. As will be described in detail below, the transition portion 44 is preferably subdivided into a plurality of segments passing into or adjacent one another or into the hub 40 and the circumferential edge 42.

Figure 8:
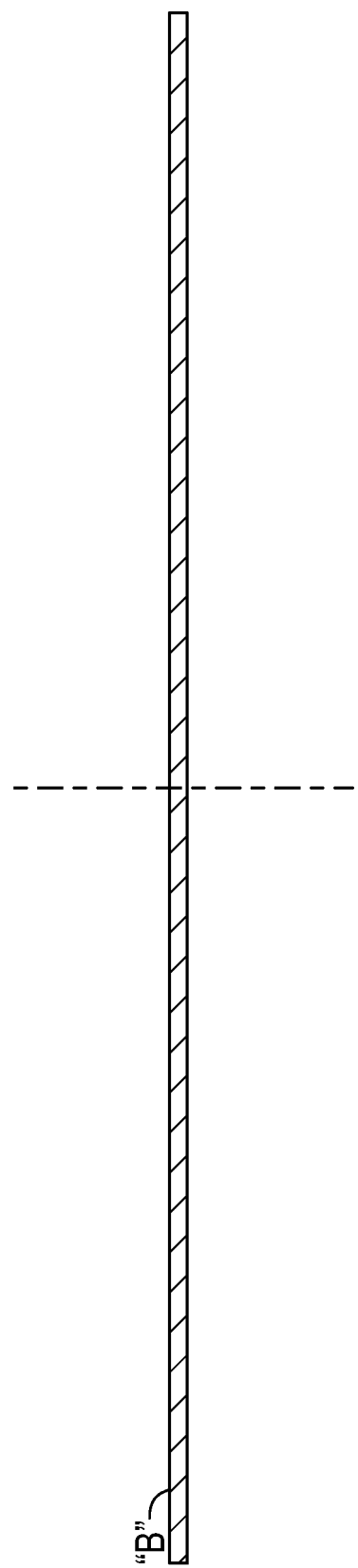
FIG. 8 is a sectional view showing a blank which can be used to produce the wheel disc shown in FIGS. 1-7.

In a preferred embodiment, the wheel disc 12 is preferably produced from a single steel blank which is then formed by suitable means to form the wheel disc 12. The blank may be first provided as a smooth, flat annular or ring-shaped steel disc blank B (shown in FIG. 8), and then preferably shaped by flow forming into the final wheel disc shape. Alternatively, the blank B may be formed by any suitable means, such as stamping and/or flow forming, into a wheel disc "preform" (such as the preform 48 shown in FIG. 9) having a particular partially formed wheel disc shape before it is formed into the final wheel disc shape, preferably by flow forming.

Figure 9:
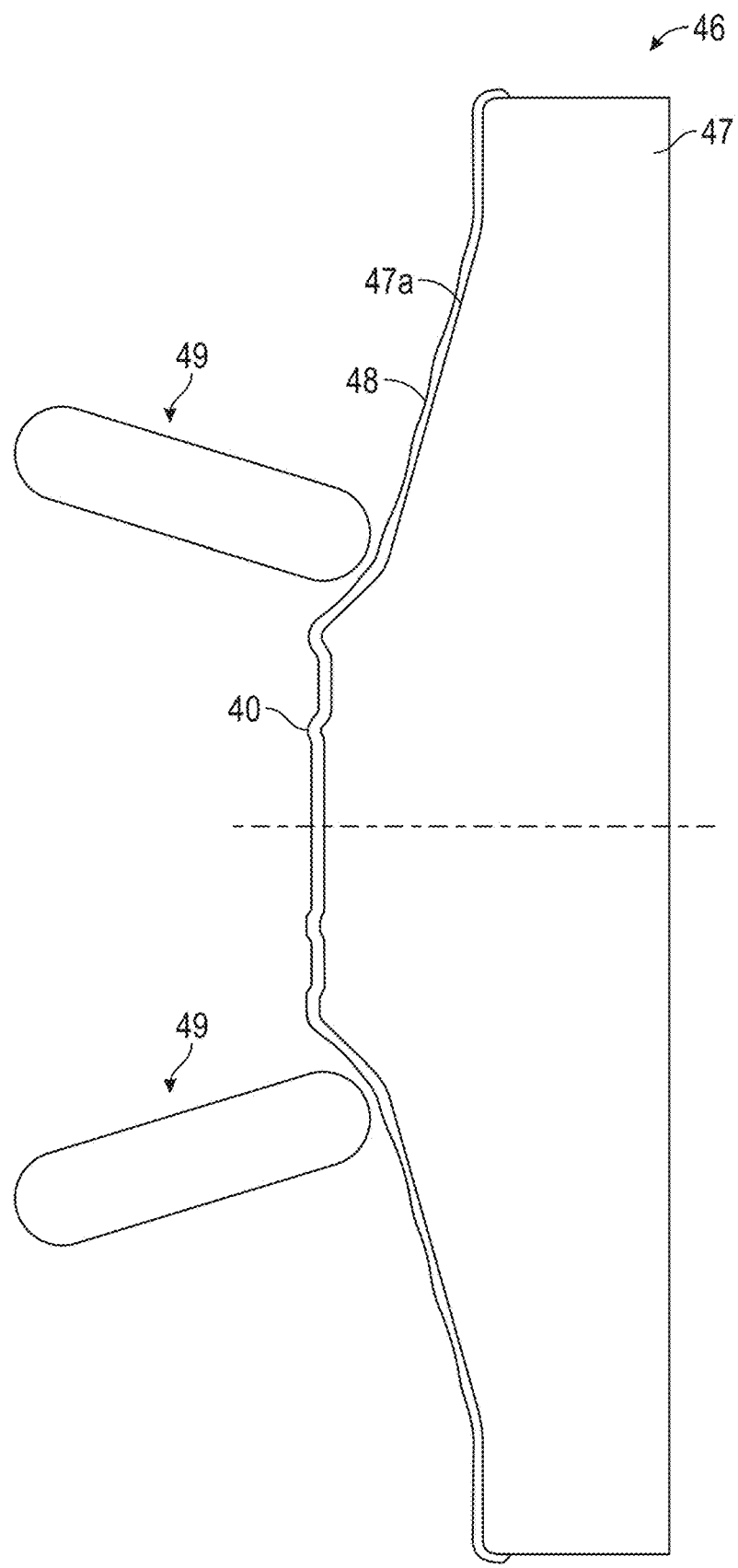
FIG. 9 is a schematic illustration of a flow forming machine schematically illustrating the process of flow forming a wheel disc preform.

It is known to produce wheel discs by a flow forming or flow turning process. However, as will be explained in detail below, the present invention relates to the manufacture of a wheel disc 12 by a flow forming process that provides for varying thicknesses in the transition portion 44. Preferably, in the flow forming process, a flow forming machine is used to form the wheel disc preform into the desired shape of the wheel disc 12. For example, there is schematically illustrated in FIG. 9 a flow forming machine, indicated generally at 46, having a mandrel 47 which receives a wheel disc preform 48. The mandrel 47 may have a profiled surface 47a corresponding to the desired profile shape of the final formed wheel disc. The wheel disc preform 48 may be clamped at a central region such as the hub 40. The material of the wheel disc preform extending radially outwardly from the hub 40 is pressed and elongated by means of flow forming under rotation of a roller 49 (or other tools) against wheel disc preform mounted on the mandrel 47 (or other tools) in order to obtain the desired contour. Note that the mandrel 47 and the rollers 49 are drawn very schematically and generic. Thus, the cross-sectional profile of the transition portion 44 can be produced to provide for a desired varying thickness of the transition portion 44. This is unlike conventional wheel discs which are made by flow forming or flow turning having generally uniform surfaces on their inner and outer sides of the wheel disc.

In the illustrated embodiment, the hub 40 has a front face or surface 50, as seen in FIGS. 1, 2, 3, 5 and 6, and a rear face or surface 52, as seen in FIGS. 2, 4, 5 and 6. The front surface 50 is located on the outboard side of the wheel 10 when mounted on a vehicle. The rear surface 52 is located on the inboard side of the wheel 10 when mounted on a vehicle. The hub 40 functions as a wheel mounting portion or center mounting portion of the wheel 10 for connecting with an axle (not shown) via a plurality of lug bolts (not shown) and lug nuts (not shown).

The hub 40 includes a circular outer edge portion, indicated generally at 54, which generally defines the edge of the hub 40 which joins or connects with the transition portion 44 of the wheel disc. The hub 40 has a diameter $H_D$ (see FIGS. 5 and 6). Although the hub 40 includes a plurality of apertures formed therein, as will be discussed in detail below, the hub 40 may be formed with a relatively constant thickness $H_t$ (see FIG. 5) between the front and rear surfaces 50 and 52. In fact, the thickness $H_t$ of the hub 40 may coincide with the thickness of the initial blank from which the wheel disc 12 is formed. Of course, the hub 40 may be formed with a varying thickness if so desired. In a preferred embodiment, the thickness $H_t$ is within a range of about 3 millimeters to about 7.5 millimeters. In a more preferred embodiment, the thickness $H_t$ is within a range of about 3.5 millimeters to about 6.8 millimeters.

The hub 40 includes a centrally located pilot aperture or hub hole 56. The hub hole 56 extends along the wheel axis W. The hub hole 56 may accommodate a portion of the axle and/or receive a protective/decorative cap (not shown). The hub hole 56 may have any suitable diameter. The hub hole 56 may be formed by a stamping process performed on the blank.

A plurality of lug bolt receiving holes 58 are formed in the hub 40 and are circumferentially spaced around the hub hole 56 and the wheel axis W. In the illustrated embodiment, the hub 40 includes five lug bolt receiving holes 58. Alternatively, the number and/or location of the lug bolt receiving holes 58 may be other than illustrated if so desired. The lug bolt receiving holes 58 receive the lug bolts (not shown) for securing the vehicle wheel 10 with lug nuts (not shown) on the axle of an associated vehicle. The lug bolt receiving holes 58 may also be used to secure the blank for the flow forming machine during production of the wheel disc 12.

The details of the transition portion 44 will now be discussed. The transition portion 44 defines a front face or surface 60, as seen in FIGS. 1, 2, 3, 5 and 6, and a rear face or surface 62, as seen in FIGS. 2, 4, 5 and 6. The front surface 60 is located on the outboard side of the wheel 10 when mounted on a vehicle. The rear surface 62 is located on the inboard side of the wheel 10 when mounted on a vehicle. As stated above, it is preferred to form the majority of the transition portion 44 with varying thickness between the front and rear surfaces 60 and 62. This varying thickness optimizes the material usage of the wheel disc 12 which may reduce the overall mass of the wheel disc 12.

Figure 4:
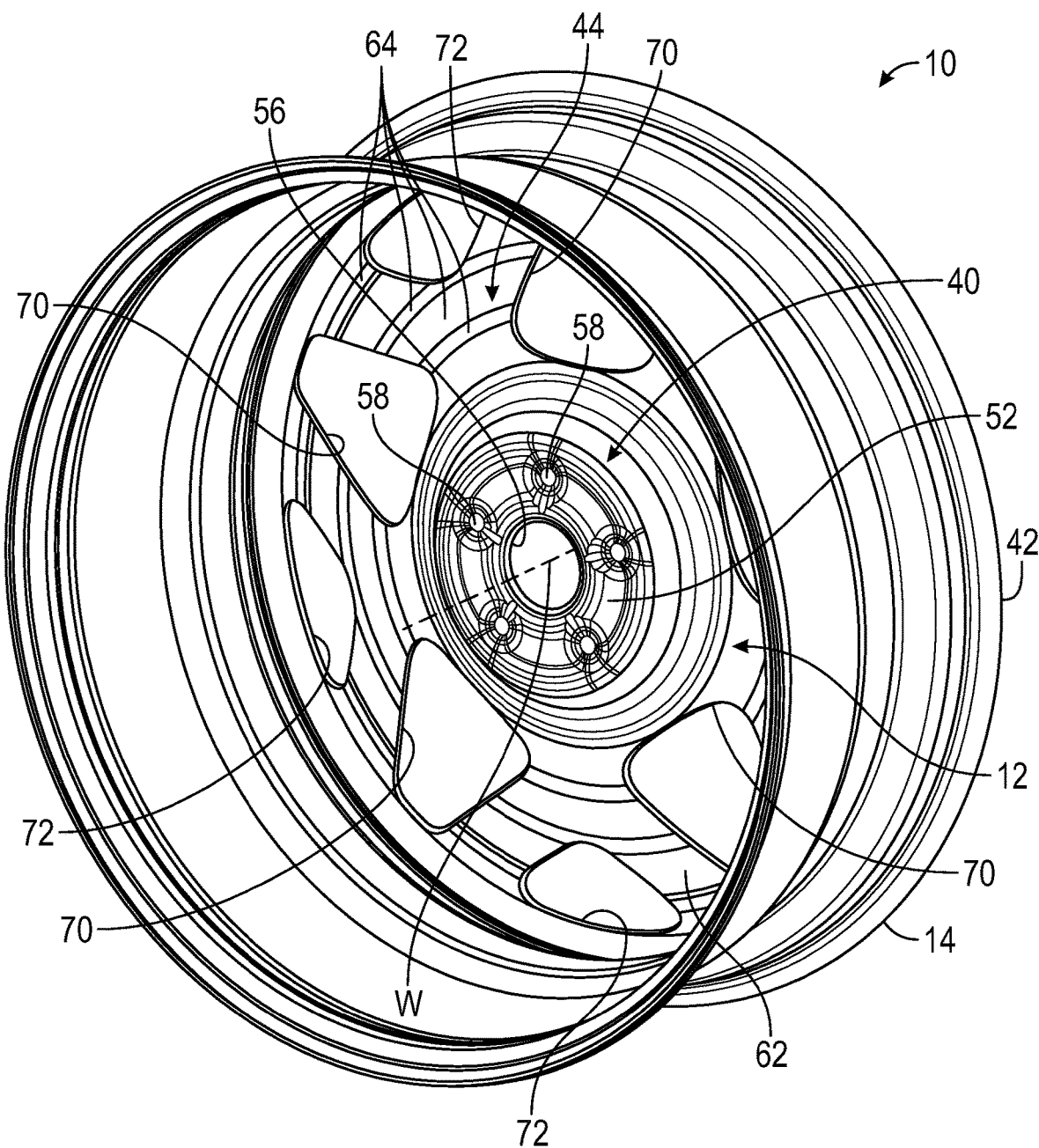
FIG. 4 is a rear perspective view of the wheel of FIG. 1.
Figure 5:
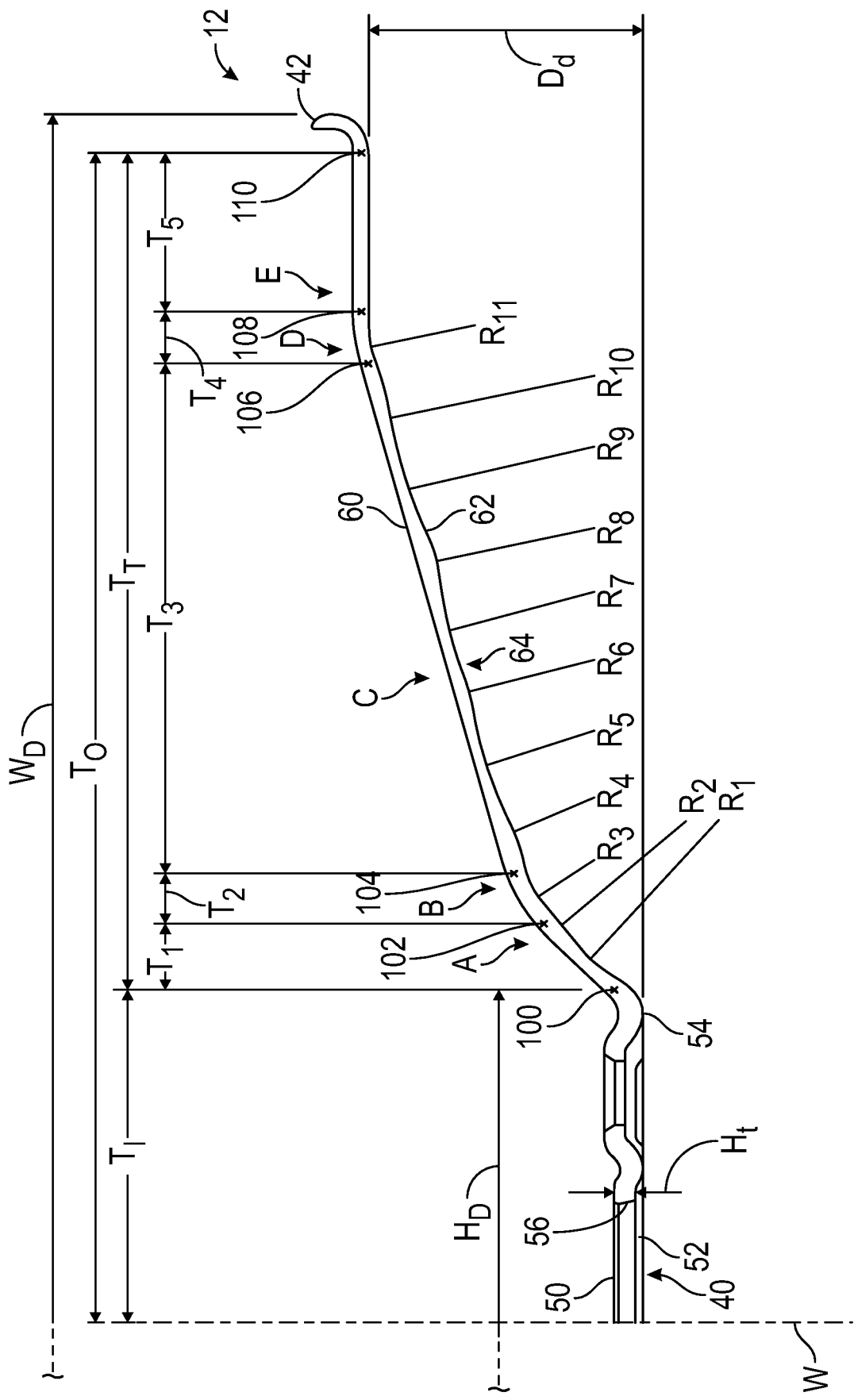
FIG. 5 is an enlarged sectional view of a portion of the wheel disc of the wheel of FIG. 1 illustrating the profile details of the rear surface of the wheel disc.
Figure 6:
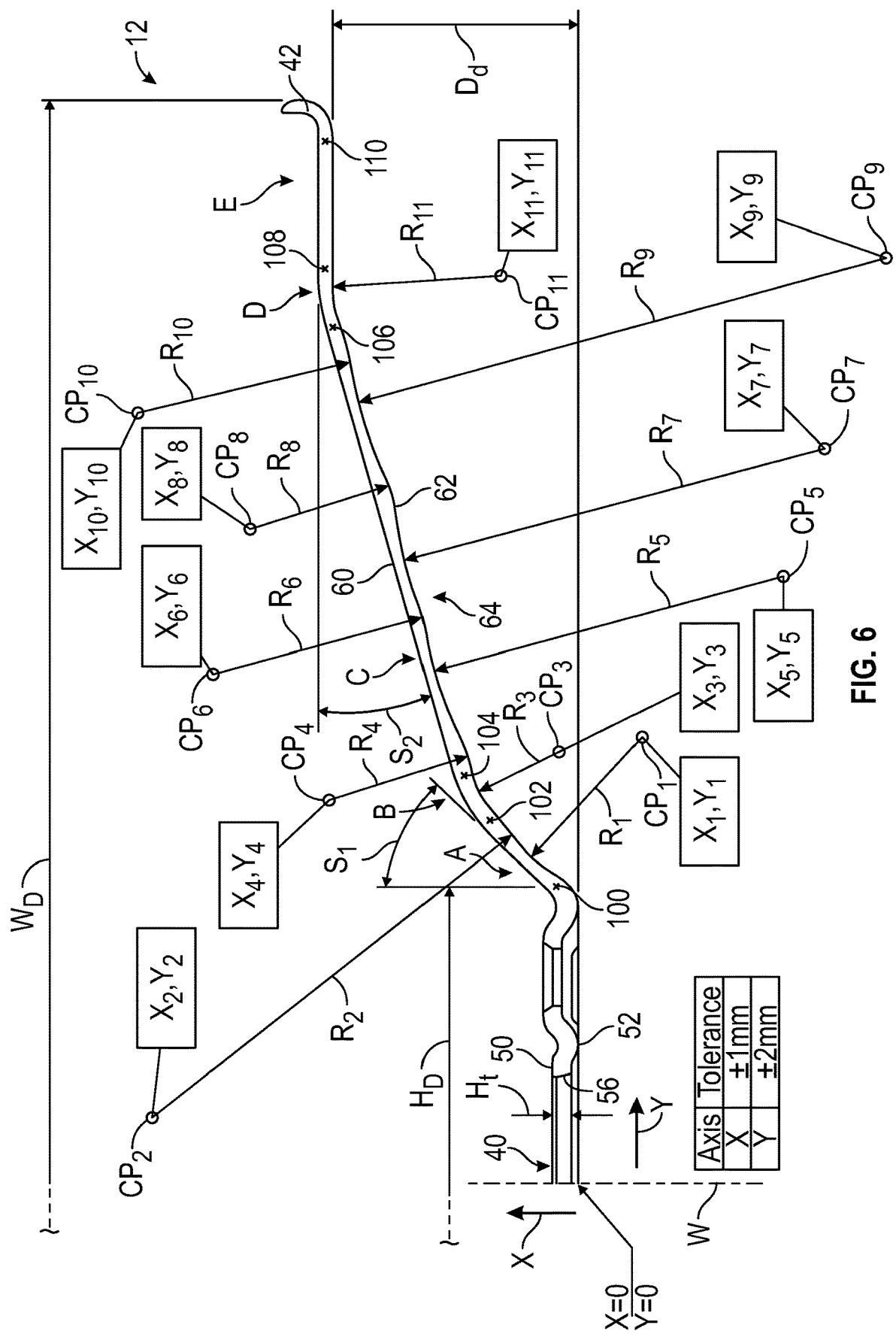
FIG. 6 is an enlarged sectional view of a portion of the wheel disc of the wheel of FIG. 1 illustrating the profile details and dimensional characteristics of the rear surface of one example of a wheel disc.

In a preferred embodiment, the varying thickness is produced by forming a plurality of circular waves or ring-shaped undulations or undulating "impressions", indicated generally at 64 (see FIG. 4), onto the rear surface of the transition portion 44, as best shown in FIGS. 4, 5, and 6. These undulations 64 may be formed as alternating convex and concave ring-shaped curves concentric about the wheel axis W, as will be discussed below.

The transition portion 44 preferably includes a plurality of vent holes formed therethrough. In the illustrated embodiment, the transition portion 44 includes a set of five large vent holes 70, and a set of five smaller outer vent holes 72. The vent holes 70 and 72 not only provide ventilation to wheel brakes (not shown) positioned adjacent to the wheel 10 when the wheel 10 is mounted on a vehicle but also provide for a reduction in material of the transition portion 44, thereby reducing the overall mass of the wheel disc 12. The number of vent holes 70 and 72 in the illustrated embodiment corresponds to the five-bolt hole pattern of the lug bolt receiving holes 58 for an aesthetically pleasing appearance.

The vent holes 70 are preferably circumferentially spaced around the transition portion 44 about the wheel axis W equidistant from one another. Similarly, the vent holes 72 are preferably circumferentially spaced around the transition portion 44 about the wheel axis W equidistant from one another although offset from the vent holes 70. Of course, it should be understood that the transition portion 44 may have any number of vent holes having any suitable shape and positioned at any suitable location within the transition portion 44.

Referring now to FIG. 1, in the illustrated embodiment of the wheel disc 12, the vent holes 70 each have a generally trapezoidal shape with curved corners formed therein. Each of the vent holes 70 is similar in shape and size. The vent holes 70 extend a relatively large amount in the radial direction, as shown in the cross-section of FIG. 2, thereby removing a fair amount of material. Referring back to FIG. 1, the vent holes 70 have an inner wall 74, an outer wall 76, and a pair of sloping walls 78. The inner wall 74 has a general width 70a. The outer wall 76 has a general width 70b. The vent hole 70 has a general radial length 70c. As can be understood, the shape, number and/or location of the vent holes 70 can be other than illustrated and described if so desired.

In a preferred embodiment, the width 70a of the inner wall 74 may range from about 30 millimeters to about 120 millimeters. In a more preferred embodiment, the width 70a of the inner wall 74 may range from about 30 millimeters to about 100 millimeters. Consequently, in a preferred embodiment, the width 70b of the outer wall 76 may range from about 50 millimeters to about 150 millimeters. In a more preferred embodiment, the width 70b of the outer wall 76 may range from about 80 millimeters to about 130 millimeters. In a preferred embodiment, the radial length 70c may range from about 50 millimeters to about 160 millimeters. In a more preferred embodiment, the radial length 70c may range from about 50 millimeters to about 150 millimeters.

In the illustrated embodiment of the wheel disc 12, the vent holes 72 each have a generally triangular shape with curved corners formed therein. Each of the vent holes 72 is similar in shape and size. The vent holes 72 have an outer wall 80 and a pair of sloped walls 82. The vent hole 72 has a general width 72a. The vent hole 72 has a general radial length 72b. In a preferred embodiment, the width 72a may range from about 30 millimeters to about 100 millimeters. In a more preferred embodiment, the width 72a may range from about 30 millimeters to about 90 millimeters. Consequently, in a preferred embodiment, the length 72b may range from about 30 millimeters to about 90 millimeters. In a more preferred embodiment, the length 72b may range from about 40 millimeters to about 85 millimeters.

The formation of the vent holes 70 and 72 removes a relatively substantial portion of the material from the transition portion 44. It is preferred that the design of the wheel disc 12, and in particular the transition portion 44, be designed such that the presence of the vent holes 70 and 72 are considered when designing the undulations 64 on the rear surface 62 of the transition portion 44. Thus, the lack of material being removed from the areas at the vent holes 70 and 72 determines the design aspects and geometry of the undulations 64. Of course, other factors should be considered such as the weight target of the wheel 10, the design intent of the wheel 10, and the performance intent of the wheel 10. The ventilation holes 70 and 72 may be formed by any suitable method, such as with a piercing, punching or cutting operation, Stress levels at critical points within the wheel disc 12 should be discovered and considered in determining the shape of the rear surface 62 of the transition portion 44. Thus, the shape of the vent holes 70 and 72 can affect the optimization results in order to achieve the performance requirements. The design implications for the desired thickness differences in the undulations 64 formed in the rear surface 62 of the transition portion 44 will generally correlate to the location and the lack of material from the vent holes 70 and 72.

It should also be understood that the illustration of the wheel disc 12 shown in cross-section in FIGS. 5 and 6 lacks cross-sectional lines to help with clarity and understanding of the drawings in FIGS. 5 and 6. Lastly, the details of the drawings in FIGS. 5 and 6 (as well as the other Figures) is not necessarily to scale and may have exaggerated dimensions to assist in clarity and understanding of the drawings.

For descriptive purposes, the transition portion 44 is subdivided into a plurality of concentric radial or annular segments. In the illustrated embodiment as shown in FIGS. 5 and 6, there are generally five segments, indicated generally at A, B, C, D and E. The segments A, B, C, D and E are separated from one another at transition points 100, 102, 104, 106, 108, and 110. The transition points 100, 102, 104, 106, and 108 are radially spaced from one another and refer to a radial dimension or distance relative to the wheel axis W. The segments A, B, C, D and E generally pass into each other or into the hub 40 or the outer circumferential edge 42 of the wheel disc 12. Each of the segments A, B, C, D and E generally includes an inner end situated closer to the wheel axis W, and an outer end situated farther away from the wheel axis W. More specifically, the segment A extends between transition points 100 and 102.

The transition point 100 generally corresponds to the outer edge of the circular outer edge portion 54 of the hub 40. The curved segment B extends between the transition points 102 and 104. The segment C extends between the transition points 104 and 106. In a preferred embodiment, the vent holes 70 and 72 are formed in segment C. The curved segment D extends between the transition points 106 and 108. The segment E extends between the transition points 108 and 110. The transition point 110 is generally positioned adjacent the outer circumferential edge 42 of the wheel disc 12.

As can be seen in FIG. 5, the transition points 100, 102, 104, 106, 108, and 110 generally correspond to curvature changes on the front surface 60 of the transition portion 44. In a preferred embodiment of the wheel disc 12, the front surface 60 of the transition portion 44 can generally be described as being "smooth" (without undulations) such that changes in the profile of the front surface 60 are either straight without curvature to form a straight frustoconical shape, or include a single smooth curvature between two segments having frustoconical shapes with differing slopes (angles) relative to the wheel axis W, thereby connecting the two frustoconical slopes. The term smooth as used herein may refer to a surface that is generally an even and regular surface generally free from perceptible projections, lumps, or indentations. Of course, a smooth surface may be curved such as the front surfaces 60 of the ring-shaped curved segments B and D. Contrary, the rear surface 62 of the transition portion 44 preferably includes undulating curves of concentric rings formed therein, as will be discussed below.

The front surface 60 between the transition points 100 and 102 is relatively straight (shown in cross-section) or without curvature forming a generally straight frustoconical shape about the wheel axis W. The inner end of the segment A connects with the circular outer edge portion 54 of the hub 40. The outer end of the segment A connects with the inner end of the segment B. Similar to the segment A, the front surface 60 at the segment C, between the transition points 104 and 106, is relatively straight without curvature forming a generally straight frustoconical shape about the wheel axis W. However, the slope at segment C is different from the slope at segment A relative to the wheel axis W. Segment B (between transition points 102 and 104) joins the segments A and C together with a curvature that smoothly blends in with both of the segments A and C. In a similar manner, the curved segment D (between the transition points 106 and 108) blends the sloped frustoconical front surface 60 of the segments C and E (between the transition points 108 and 110) together smoothly. It is noted that the front surface 60 at the segment E may be perpendicular to the wheel axis W.

A shown in FIG. 6, the conical front surface 60 at the segment A is sloped at an angle $S_1$ relative to the wheel axis W. In the illustrative embodiment, the angle $S_1$ is about 43 degrees relative to the wheel axis W. In a preferred embodiment, the angle $S_1$ may range from about 15 degrees to about 60 degrees. In a more preferred embodiment, the angle $S_1$ may range from about 20 degrees to about 45 degrees.

The conical front surface 60 at the segment C is sloped at an angle $S_2$ relative to 90 degrees from the wheel axis, as indicated in FIG. 6. In the illustrative embodiment, the angle $S_2$ is about 16 degrees. Thus, the angle $S_2$ is about 74 degrees (90-16) relative to the wheel axis W. In a preferred embodiment, the angle $S_2$ may range from about 45 degrees to about 85 degrees. In a more preferred embodiment, the angle $S_2$ may range from about 50 degrees to about 70 degrees.

The wheel 10 can be manufactured to any size suitable size for mounting a tire thereon. Tire sizes for conventional vehicles are generally within the range of about 16 inches (406 mm) to about 22 inches (560 mm), for example. With respect to FIGS. 5 and 6 and for descriptive purposes, the illustrated embodiment of the wheel disc 12 relates to a wheel 10 having a 22 inch or about 560 mm "wheel diameter" as conventionally understood as the diameter of the bead seats 30 and 32. Note that the outermost diameter $W_D$ for the illustrated embodiment is about 600 mm. The rear surface 62 of the segment E is spaced by a depth $D_d$ taken in an axial direction generally from the rear surface 52 of the hub 40.

In the illustrative embodiment, the depth $D_d$ is about 89 mm. In a preferred embodiment, the depth $D_d$ may range from about 25 millimeters to about 120 millimeters. In a more preferred embodiment, the depth $D_d$ may range from about 30 millimeters to about 110 millimeters. In general, the dimensions of the depth $D_d$, the slopes $S_1$ and $S_2$, and the dimensions of the segments A, B, C, D, and E will be generally determined by the requirements for accommodating a brake caliper (not shown) adjacent thereto when the wheel 10 is mounted on the vehicle.

A stated above, the transition portion 44 may be formed to any suitable size and shape. Referring to the illustrated embodiment of FIG. 5, the transition portion 44 is dimensionally defined by an outer radius $T_O$ and an inner radius $T_I$ from the wheel axis W. The radial length or distance of the transition portion 44 is defined by the radial length $T_T$ ($T_O$ minus $T_I$). In a preferred embodiment, the radial length $T_T$ may range from about 110 millimeters to about 210 millimeters. In a more preferred embodiment, the radial length $T_T$ may range from about 120 millimeters to about 200 millimeters.

As shown in FIG. 5, the segment A has a radial length $T_1$. The segment B has a radial length $T_2$. The segment C has a radial length $T_3$. The segment D has a radial length $T_4$. The segment E has a radial length $T_5$. In the illustrated embodiment, the radial length $T_1$ is about 8% of the radial length TT. The radial length $T_2$ is about 6% of the radial length Tr. The radial length $T_3$ is about 61% of the radial length $T_T$. The radial length $T_4$ is about 6% of the radial length $T_T$. The radial length $T_5$ is about 19% of the radial length $T_T$. In a preferred embodiment, the radial length $T_1$ may range from about 5% to about 30% of the radial length $T_T$. The radial length $T_2$ may range from about 5% to about 30% of the radial length $T_T$. The radial length $T_3$ may range from about 60% to about 80% of the radial length $T_T$. The radial length $T_4$ may range from about 5% to about 15% of the radial length $T_T$. The radial length $T_5$ may range from about 10% to about 30% of the radial length $T_T$.

As stated previously, the rear surface 62 of the transition portion 44 preferably includes a plurality of undulating impressions 64 of concentric rings formed therein. As shown in FIG. 5, the rear surface 62 of the transition portion 44 has a plurality of alternating concave and convex undulations 64 defined by curves formed by radii $R_1$ through $R_{11}$. Note that the radii $R_1$ through $R_{11}$ have differing lengths relative to one another. Dimensional details of the radii lengths and center point coordinates will be explained in detail below with respect to FIG. 6.

As shown in FIG. 5, the segment A includes a concave ring-shaped curve formed in the rear surface 62 thereof corresponding to the radius $R_1$. The term concave as used herein refers to a curvature formed into the rear surface 62 towards the front surface 60, thereby thinning the thickness of the transition portion 44 at that region. A convex curvature relates to a curvature formed into the rear surface 62 but in a direction away from the front surface 60, thereby expanding the thickness of the transition portion 44 at that region. The radius $R_2$ corresponds to a convex ring-shaped curvature extending between the segments A and B. The radius $R_3$ is formed in segment B and corresponds to a concave ring-shaped curvature.

The rear surface 62 of the segment C includes alternating convex and concave ring-shaped curvatures corresponding to the radii $R_4$ through $R_{10}$. Thus, the segment C includes a total of seven differing curvatures in the illustrated embodiment. The segment D includes a concave ring-shaped curvature corresponding to the radius $R_{11}$. In the illustrated embodiment, the segment E does not include curvatures formed in the rear surface 62 therein and is preferably planar such that the rear surface 62 at segment E is perpendicular to the wheel axis W. Of course, the segment E may be formed with a single curvature or multiple curvatures if so desired.

As can be appreciated, depending upon the particular size of the vehicle wheel (which can typically range from 16 inch to 22 inch), the segments A-E may have any combination of the following number of ring-shaped curvatures in accordance with the present invention. The segment A may include anywhere from zero to three ring-shaped curvatures. The segment B may include anywhere from zero to two ring-shaped curvatures. The segment C may include anywhere from one to twenty ring-shaped curvatures. The segment D may include anywhere from zero to two ring-shaped curvature. The segment E may include anywhere from zero to three ring-shaped curvatures.

Figure 7:
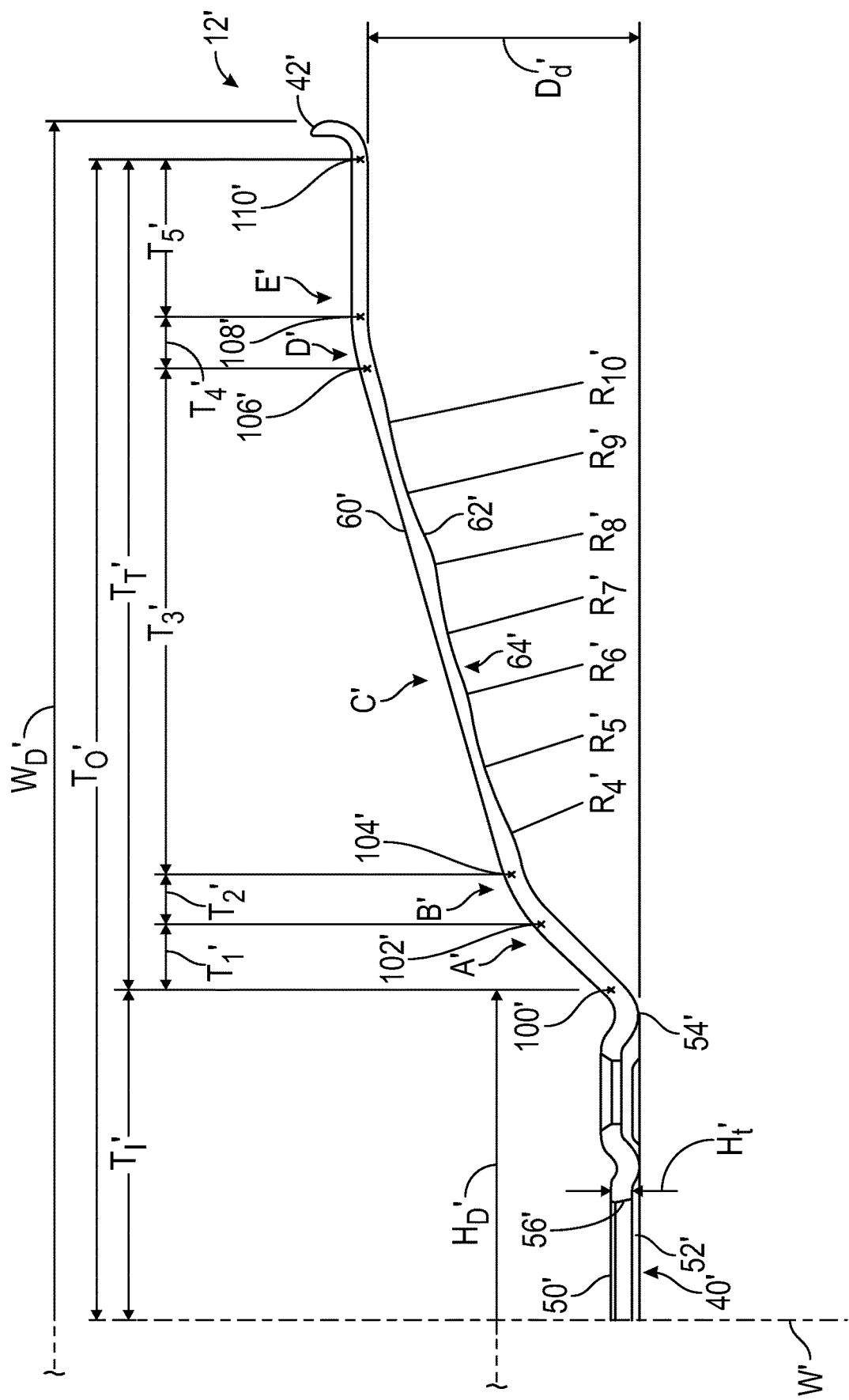
FIG. 7 is a view similar to FIG. 5 showing another embodiment of a wheel disc in accordance with the present invention.

Alternatively, one or more of the segments A-E can be other than illustrated and described. For example, as shown in the embodiment illustrated in FIG. 7 and using like reference numbers with a "'" added to indicate corresponding and/or similar parts or structures thereof, a wheel disc 12' can be provided with a plurality of ring-shaped curvatures (corresponding to the radii $R_4$' through $R_{10}$'), in only segment C', the number anywhere from one to twenty of such ring-shaped curvatures.

The blank or wheel disc preform which is used to form the wheel disc 12 may be formed with a constant thickness that corresponds to the thickness $H_t$ of the hub 40. During formation of the undulating impressions 64 formed in the rear surface 62 of the transition portion 44, the thickness at the segments A, B, C, D, and E may be reduced. In a preferred embodiment, the segment A has a maximum thinning of 40% of the thickness $H_t$ of the hub 40. In a preferred embodiment, the segment B has a maximum thinning of 40% of the thickness H of the hub 40. In a preferred embodiment, the segment C has a maximum thinning of 60% of the thickness $H_t$ of the hub 40. In a preferred embodiment, the segment D has a maximum thinning of 40% of the thickness $H_t$ of the hub 40. In a preferred embodiment, the segment E has a maximum thinning of 60% the thickness H: of the hub 40.

As shown in FIG. 6, the curvatures of the undulating impressions 64 may be formed with differing radii dimensions $R_{1-11}$ stemming from corresponding center-points $CP_{1-11}$. The dimensions of the radii and center-points will generally correspond to the dimensions in the tool forming the rear surface 62 of the transition portion 44 if formed by a flow forming machine a described above.

Referring to FIG. 6, the illustrated wheel disc 12 relates to a wheel 10 having a 22 inch or about 560 mm "wheel diameter". The following table details preferred dimensions of the formations of the concave and convex radii $R_{1-11}$ of such a sized wheel as the illustrated embodiment of FIG. 6. Note that the X and Y coordinates stem from the wheel axis W at the rear surface 52 of the hub 40, as indicated at X=0 and Y=0 in FIG. 6. The X axis is generally along a plane coplanar with the rear surface 52 of the hub 40. A negative sign (−) in the X coordinates refers to a center-point coordinate locate above or in the outboard side of the wheel 10.

| Radius R | Length of radius in mm | Center-point CP | X coordinate of CP in mm | Y coordinate of CP in mm |
| --- | --- | --- | --- | --- |
| $R_1$ | 45 | $CP_1$ | $X_1 = 17.1$ | $Y_1 = 123.7$ |
| $R_2$ | 126 | $CP_2$ | $X_2 = -117.9$ | $Y_2 = 18.8$ |
| $R_3$ | 30 | $CP_3$ | $X_3 = -5.5$ | $Y_3 = 119.6$ |
| $R_4$ | 40 | $CP_4$ | $X_4 = -69.2$ | $Y_4 = 106$ |
| $R_5$ | 100 | $CP_5$ | $X_5 = 56.3$ | $Y_5 = 168.1$ |
| $R_6$ | 60 | $CP_6$ | $X_6 = -101.4$ | $Y_6 = 141$ |
| $R_7$ | 120 | $CP_7$ | $X_7 = 67.5$ | $Y_7 = 203.2$ |
| $R_8$ | 40 | $CP_8$ | $X_8 = -91$ | $Y_8 = 181$ |
| $R_9$ | 150 | $CP_9$ | $X_9 = 83.7$ | $Y_9 = 255.8$ |
| $R_{10}$ | 60 | $CP_{10}$ | $X_{10} = -121.9$ | $Y_{10} = 212.8$ |
| $R_{11}$ | 46.4 | $CP_{11}$ | $X_{11} = -22$ | $Y_{11} = 250.6$ |

As can be understood, the specific numbers, ranges, dimensions and/or percentages disclosed herein can be other than illustrated and described if so desired.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A wheel disc configured for use in a full face fabricated vehicle wheel comprising:
a hub located centrally within the wheel disc and defining a wheel axis;
an outer circumferential edge; and
a transition portion radially extending between the hub and the outer circumferential edge, wherein the transition portion has a front surface and a rear surface such that the front surface has a smooth non-undulating profile and the rear surface has a plurality of concentric ring-shaped curvatures formed therein, thereby providing the transition portion with a variable thickness between the front and rear surfaces, wherein the plurality of concentric ring-shaped curvatures include undulations formed only in the rear surface of the transition portion.

2. The wheel disc according to claim 1, wherein the undulations are formed as alternating convex and concave ring-shaped curves concentric about the wheel axis.

3. The wheel disc according to claim 1, wherein a plurality of vent holes are formed in the transition portion.

4. The wheel disc according to claim 1, wherein the transition portion is subdivided into a plurality of concentric segments.

5. The wheel disc according to claim 4, wherein the transition portion is divided into first, second, third, fourth, and fifth sequential segments extending radially outwardly from the wheel axis.

6. The wheel disc according to claim 5 wherein the first segment includes anywhere from zero to three ring-shaped curvatures, the second segment includes anywhere from zero to two ring-shaped curvatures, the third segment includes anywhere from one to twenty ring-shaped curvatures, the fourth segment includes anywhere from zero to two ring-shaped curvature, the fifth segment includes anywhere from zero to three ring-shaped curvatures.

7. The wheel disc according to claim 5 where in the first segment has a maximum thinning of 40% of a thickness of the hub, the second segment has a maximum thinning of 40% of the thickness of the hub, the third segment has a maximum thinning of 60% of the thickness of the hub, the fourth segment has a maximum thinning of 40% of the thickness of the hub, and/or the fifth segment has a maximum thinning of 60% of the thickness of the hub.

8. The wheel disc according to claim 5, wherein the concentric segments include undulations formed as alternating convex and concave ring-shaped curves concentric about the wheel axis in the rear surfaces of the first, second, third, and fourth segments.

9. The wheel disc according to claim 5, wherein the first segment is adjacent an outer edge of the hub.

10. The wheel disc according to claim 5, wherein the front surface of the first segment has a frustoconical shape sloped at a first angle relative to the wheel axis.

11. The wheel disc according to claim 10, wherein the front surface of the third segment has a frustoconical shape sloped at a second angle relative to the wheel axis.

12. The wheel disc according to claim 11, wherein the third segment includes vent holes formed therein, and wherein the third segment has a radial length of about between 50 percent to about 70 percent of the radial length of the transition portion.

13. The wheel disc according to claim 11, wherein the first angle is different from the second angle.

14. The wheel disc according to claim 11, wherein the second segment joins the first and third segments together with a curvature that smoothly blends in with the first and third segments.

15. The wheel disc according to claim 14, wherein the rear surface of the fifth segment is generally planar and perpendicular to the wheel axis.

16. The wheel disc according to claim 15, wherein the fourth segment joins the third and fifth segments together with a curvature that blends in with the third and fifth segments.

17. The wheel disc according to claim 15, wherein the rear surface of the fifth segment does not include concentric ring-shaped curvatures formed therein.

18. The wheel disc according to claim 17, wherein the rear surface of the fifth segment has a relatively smooth profile.

19. The wheel disc according to claim 1, produced by a flow forming process by flow forming a metallic blank, during elongation of a preformed marginal region adjoining the hub.

20. The wheel disc according to claim 19, wherein the metallic blank is a steel blank.

21. The wheel disc according to claim 1, wherein the wheel disc is a steel wheel disc.

22. The wheel disc according to claim 1, wherein the wheel disc is an aluminum, magnesium, titanium or alloys thereof, carbon fiber and/or a composite material wheel disc.

23. A full face fabricated vehicle wheel having a wheel rim which is configured to be secured to the wheel disc of claim 1, wherein the wheel disc is a steel wheel disc.

24. A method of forming the wheel disc of claim 1 wherein the wheel disc is a steel wheel disc and is formed into a final desired shape by a flow forming process.

25. A method of forming a full face fabricated vehicle wheel having a wheel rim which is configured to be secured to the wheel disc of claim 1, wherein the wheel disc is a steel wheel disc.

26. A steel wheel disc configured for use in a full face fabricated vehicle wheel comprising:
   a hub located centrally within the wheel disc and defining a wheel axis;
   an outer circumferential edge; and
   a transition portion radially extending between the hub and the outer circumferential edge and having a plurality of vent holes formed therein, wherein the transition portion has a front surface and a rear surface such that the front surface has a relatively smooth non-undulating profile and the rear surface has a plurality of concentric ring-shaped concentric ring-shaped curvature formed therein, thereby providing the transition portion with a variable thickness between the front and rear surfaces, wherein the plurality of concentric ring-shaped curvatures include undulations formed only in the rear surface of the transition portion.

27. The steel wheel disc according to claim 26 wherein the transition portion includes anywhere from one to twenty ring-shaped curvatures and the transition portion has a maximum thinning of 60% of a thickness of the hub.

28. A method of manufacturing a vehicle wheel disc including the steps of:
   (a) providing a metallic preform;
   (b) positioning the preform on a mandrel of a flow forming machine; and
   (c) flow forming the preform against the mandrel by a rolling tool to form a wheel disc having:
   a hub located centrally within the wheel disc and defining a wheel axis;
   an outer circumferential edge; and
   a transition portion radially extending between the hub and the outer circumferential edge, wherein the transition portion has a front surface and a rear surface such that the front surface has a smooth non-undulating profile and the rear surface has a plurality of concentric ring-shaped curvatures formed therein, thereby providing the transition portion with a variable thickness between the front and rear surfaces produced during flow-forming by displacement of the rolling tool, wherein the plurality of concentric ring-shaped curvatures include undulations formed only in the rear surface of the transition portion.

29. The method of claim 28 including the step of forming a plurality of vent holes in the transition portion by a piercing, punching or cutting operation.

\* \* \* \* \*